US012063721B2

(12) United States Patent
Sakita et al.

(10) Patent No.: US 12,063,721 B2
(45) Date of Patent: Aug. 13, 2024

(54) HEATER

(71) Applicant: Sumitomo Electric Industries, Ltd., Osaka (JP)

(72) Inventors: Shigenobu Sakita, Osaka (JP); Koichi Kimura, Osaka (JP); Akira Mikumo, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 602 days.

(21) Appl. No.: 17/429,351

(22) PCT Filed: Jan. 20, 2020

(86) PCT No.: PCT/JP2020/001768
§ 371 (c)(1),
(2) Date: Aug. 9, 2021

(87) PCT Pub. No.: WO2020/170682
PCT Pub. Date: Aug. 7, 2020

(65) Prior Publication Data

US 2022/0151027 A1 May 12, 2022

(30) Foreign Application Priority Data

Jan. 20, 2020 (WO) .................. PCT/JP2019/006873

(51) Int. Cl.
*H05B 3/22* (2006.01)

(52) U.S. Cl.
CPC ...................................... *H05B 3/22* (2013.01)

(58) Field of Classification Search
None
See application file for complete search history.

(56) References Cited

U.S. PATENT DOCUMENTS 6,740,853 B1 * 5/2004 Johnson ............ H01L 21/67109 219/443.1
2004/0108308 A1 6/2004 Okajima
(Continued)

FOREIGN PATENT DOCUMENTS

JP 2001-135464 A 5/2001
JP 2003-524885 A 8/2003
(Continued)

OTHER PUBLICATIONS

International Search Report and Written Opinion mailed on Apr. 14, 2020, received for PCT Application PCT/JP2020/001768, Filed on Jan. 20, 2020, 10 pages including English Translation.

*Primary Examiner* — Dana Ross
*Assistant Examiner* — Kuangyue Chen
(74) *Attorney, Agent, or Firm* — XSENSUS LLP

(57) ABSTRACT

A heater includes a base having a first surface and a second surface, and a heat generator disposed on a third surface of the base, the third surface being parallel to the first surface. The base includes a hole portion that opens in at least the second surface. The third surface includes a plurality of blank areas on each of which the heat generator is not present and each of which is circular. The blank areas include a first blank area including a region that the hole portion overlaps and a second blank area that does not include a region that the hole portion overlaps.

20 Claims, 7 Drawing Sheets

(56) References Cited

U.S. PATENT DOCUMENTS

| | | | | |
|---|---|---|---|---|
| 2004/0155025 | A1* | 8/2004 | Ito | H05B 3/143<br>219/444.1 |
| 2006/0157472 | A1* | 7/2006 | Mashima | H05B 3/68<br>219/444.1 |
| 2024/0081404 | A1* | 3/2024 | Jeong | H05B 3/265 |

FOREIGN PATENT DOCUMENTS

| | | | |
|---|---|---|---|
| JP | 2004-79392 | A | 3/2004 |
| JP | 2004-111107 | A | 4/2004 |

* cited by examiner

HEATER

CROSS-REFERENCE TO RELATED APPLICATIONS

The present application is based on PCT filing PCT/JP2020/001768, filed Jan. 20, 2020, which claims priority to PCT/JP2019/006873, filed on Feb. 22, 2019, the entire contents of each are incorporated herein by reference.

TECHNICAL FIELD

The present disclosure relates to a heater.

BACKGROUND ART

PTL 1 describes a heating device including a plate (base) and a heater element (heat generator). Three through-holes (hole portions) for inserting lift pins that push up an object to be heated are formed in the plate. The three through-holes are provided on a circumference that is centered at the center of the plate. The heater element is provided to avoid each through-hole so as not to cross each through-hole.

CITATION LIST

Patent Literature

PTL 1: Japanese Unexamined Patent Application Publication No. 2004-111107

SUMMARY OF INVENTION

A heater according to the present disclosure includes:

a base having a first surface on which a heating target is to be placed and a second surface on a side opposite to the first surface; and a heat generator disposed on a third surface of the base, the third surface being parallel to the first surface, wherein the base includes a hole portion that opens in at least the second surface, wherein the third surface includes a plurality of blank areas on each of which the heat generator is not present and each of which is defined as a circular region, wherein the blank areas include a first blank area including a region that the hole portion overlaps in a direction perpendicular to the third surface, and a second blank area other than the first blank area, wherein a radius of the first blank area, with a centroid of the region that the hole portion overlaps being a center, is a shortest distance between the centroid and an edge of the heat generator, wherein a radius of the second blank area is equal to the radius of the first blank area, wherein a center of the first blank area and a center of the second blank area are arranged at regular intervals on a circumference that is centered at a center of an envelope circle of the heat generator in the third surface, wherein a length of each of the intervals between the blank areas on the circumference is greater than or equal to a length of one of the blank areas on the circumference, and wherein the heat generator includes a middle portion that is provided between each pair of the blank areas that are adjacent to each other in a circumferential direction.

DESCRIPTION OF EMBODIMENTS

Technical Problem

Figure 1:
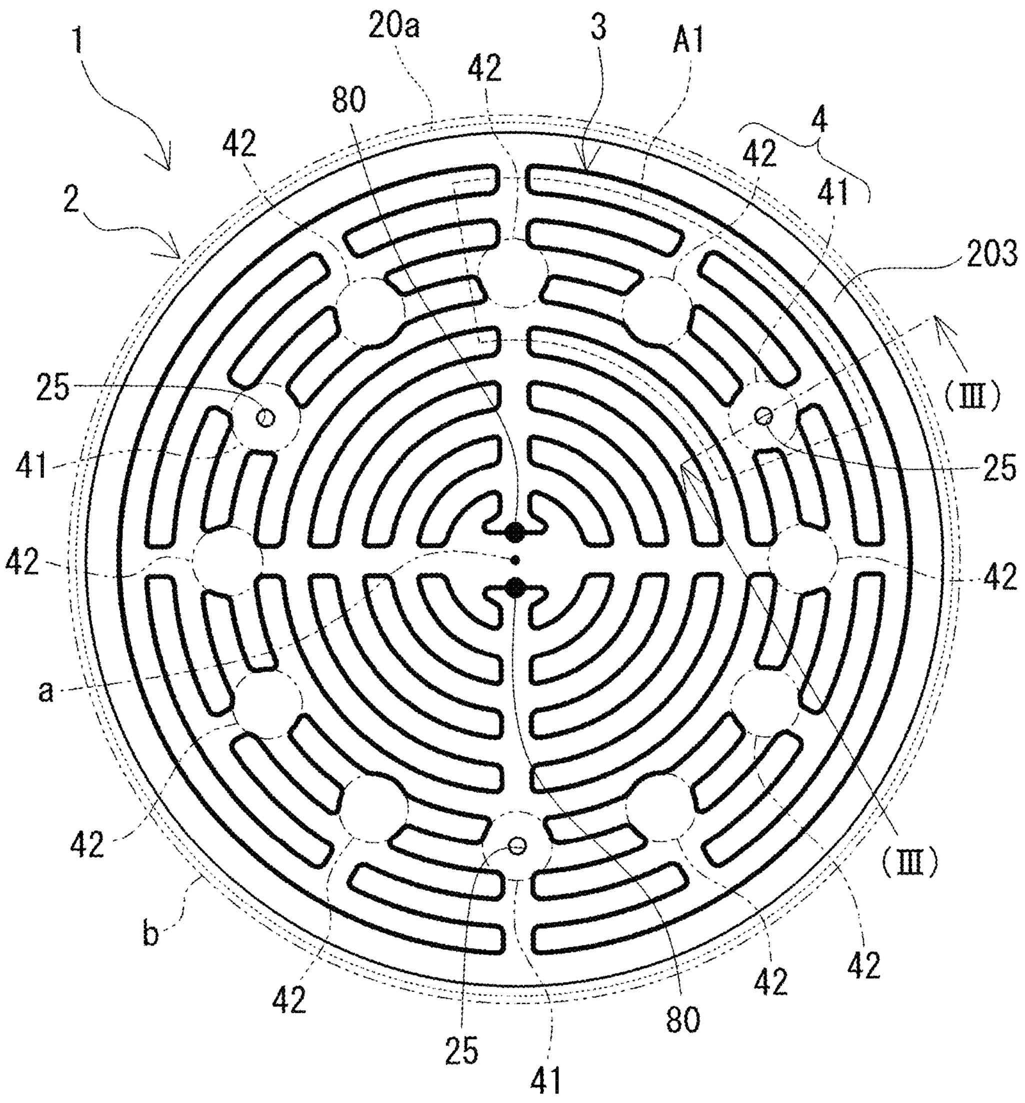
FIG. 1 is a schematic plan view of a heater according to a first embodiment.

It is required that a heater including a base, which has a surface on which a heating target is to be placed, and a heat generator, which heats the heating target via the base, heat the heating target uniformly. Therefore, it is required to heat the base so that the temperature difference over the entire surface of the base is small. For this purpose, it has been examined to make the temperature distribution in the entirety of the base uniform by appropriately designing the wiring pattern of the heat generator. Here, it is required to reduce not only the temperature difference in the radial direction of the base but also the temperature difference in the circumferential direction of the base. One of the factors that cause the temperature difference is the presence of a part, such as a through-hole for a lift pin, that is locally provided in the base and where the heat generator cannot be disposed. In particular, if the heating target is a semiconductor wafer, that is, for a heater for heating a semiconductor wafer in a semiconductor manufacturing equipment, a further uniform temperature is required.

An object of the present disclosure is to provide a heater with which it is easy to make the temperature of a base in the circumferential direction uniform.

Advantageous Effects of Present Disclosure

With the heater according to the present disclosure, it is easy to make the temperature of a base in the circumferential direction uniform.

Description of Embodiments of the Present Disclosure

First, embodiments of the present disclosure will be listed and described.

(1) A heater according to an embodiment of the present disclosure includes:

a base having a first surface on which a heating target is to be placed and a second surface on a side opposite to the first surface; and a heat generator disposed on a third surface of the base, the third surface being parallel to the first surface, wherein the base includes a hole portion that opens in at least the second surface, wherein the third surface includes a plurality of blank areas on each of which the heat generator is not present and each of which is defined as a circular region, wherein the blank areas include a first blank area including a region that the hole portion overlaps in a direction perpendicular to the third surface, and a second blank area other than the first blank area, wherein a radius of the first blank area, with a centroid of the region that the hole portion overlaps being a center, is a shortest distance between the centroid and an edge of the heat generator, wherein a radius of the second blank area is equal to the radius of the first blank area, wherein a center of the first blank area and a center of the second blank area are arranged at regular intervals on a circumference that is centered at a center of an envelope circle of the heat generator in the third surface, wherein a length of each of the intervals between the blank areas on the circumference is greater than or equal to a length of one of the blank areas on the circumference, and wherein the heat generator includes a middle portion that is provided between each pair of the blank areas that are adjacent to each other in a circumferential direction.

With the configuration described above, it is easy to make the temperature of the base in the circumferential direction uniform. This is because the plurality of blank areas in which the heat generator is not present are arranged on the same circumference at substantially regular intervals. A through-hole or the like is provided in the heater as necessary, and the first blank area, in which the heat generator is not present, is disposed so as to include the through-hole. The base having the configuration described above includes, in addition to the first blank area, the second blank area, having the same size as the first blank area, in the circumferential direction of the heater. Therefore, the distance between the blank areas that are adjacent to each other in the circumferential direction is small. Thus, with the configuration described above, even though the middle portion of the heat generator is formed between the adjacent blank areas, the temperature difference between a region between the adjacent blank areas and a region near the area does not easily become large, and the temperature difference in the circumferential direction of the base can small. Moreover, with the configuration described above, because the middle portion of the heat generator is provided between the blank areas that are adjacent to each other in the circumferential direction, it is easy make the temperature difference in the radial direction of the base small, compared with a case where the heat generator is not provided over the entire region between the adjacent blank areas.

(2) As an exemplary embodiment of the heater, the second blank area may include a plurality of second blank areas, and the number of the second blank areas may be a number such that a center-to-center distance along the circumference between the second blank areas that are adjacent to each other in the circumferential direction with none of the first blank area therebetween is greater than or equal to twice a length of one of the second blank areas on the circumference.

With the configuration described above, it is easy to provide the middle portion of the heat generator between the adjacent blank areas. Therefore, it becomes easy to design the wiring pattern of the heat generator that makes the temperature of the base in the radial direction uniform.

(3) As an exemplary embodiment of the heater, the middle portion may include a first middle portion that is in contact with an edge part of each of the blank areas, and the first middle portion may have an arc shape along an outline of the blank area.

With the configuration described above, because the first middle portion is provided in an arc shape along the outline of the blank area, the temperature of a region near the blank area does not easily decrease.

(4) As an exemplary embodiment of the heater, the middle portion may include a second middle portion having an arc shape that is concentric with the circumference.

With the configuration described above, it is easy to make the temperature difference in the circumferential direction small because the second middle portion has an arc shape that is concentric with the circumference and thus the temperature difference between a region between the blank areas and a region near the blank area does not easily increase, compared with a case where the second middle portion extends in the radial direction of the base.

(5) As an exemplary embodiment of the heater, at least one of the first blank area and the second blank area may include three or more contact portions that are in contact with the heat generator.

With the configuration described above, the temperature of a region near the blank area does not easily decrease, because the number of the contact portions is three or more.

(6) As an exemplary embodiment of the heater, the radius of the first blank area may be a distance that ensures electrical insulation between the hole portion and the heat generator in the first blank area.

With the configuration described above, electrical insulation between a member provided in the hole portion and the heat generator can be ensured.

(7) As an exemplary embodiment of the heater, the first surface may include a plurality of zones into which the first surface is segmented in the circumferential direction, the heat generator may be disposed so that a temperature of each of the plurality of zones is independently controllable, and the number of the blank areas may be greater than or equal to one time the least common multiple of the number of the zones and the number of the first blank area.

With the configuration described above, it is possible to precisely control the temperature of the base, because the temperature of each zone can be adjusted. Moreover, with the configuration described above, the number of the blank areas disposed in the zones can be made the same, because the number of the blank areas is greater than or equal to the least common multiple. Thus, with this configuration, it is easy to control the temperatures of the plurality of zones.

(8) As an exemplary embodiment of the heater, the heat generator may be embedded in the base.

With the configuration described above, it is possible to protect the heat generator against the external environment, compared with a case where the heat generator is exposed from the base. Moreover, with the configuration described above, it is possible to transfer substantially the entire heat generated by heat generator to the base.

(9) As an exemplary embodiment of the heater, the heat generator may be fixed to the second surface of the base.

With the configuration described above, it is easy to form the heat generator, compared with a case where the heat generator is embedded in the base. Moreover, with the configuration described above, it is easy to provide a terminal for supplying electric power to the heat generator, because the heat generator is exposed.

(10) As an exemplary embodiment of the heater, the base may include a first base having the first surface, and a second base disposed on a side of the first base opposite to the first surface, and the heat generator may be interposed between the first base and the second base.

With the configuration described above, the heater has high freedom in design, compared with a case where the base is composed of a single member. The reason for this is that, for example, the first base and the second base may be made from different materials.

(11) As an exemplary embodiment of the heater, the hole portion may be a through-hole through which a lifter pin for supporting the heating target is inserted.

If the heating target is a semiconductor wafer, a lifter pin for lifting a wafer is generally used to place or replace the wafer. The lifter pin is used to lift a wafer, which is a heating target, from below through a through-hole of the base. Three lifter pins are generally used, and three through-holes are arranged in the circumferential direction of the heater.

(12) As an exemplary embodiment of the heater, the heating target may be a semiconductor wafer.

The configuration described above, with which it is easy to make the temperature of the base in the circumferential direction uniform, is particularly suitable as a heater for heating a semiconductor wafer for which high uniformity is required.

Details of Embodiments of the Present Disclosure

Details of embodiments of the present disclosure will be described below. The same numerals in the figures denote elements having the same name.

First Embodiment

[Heater]

Figure 2:
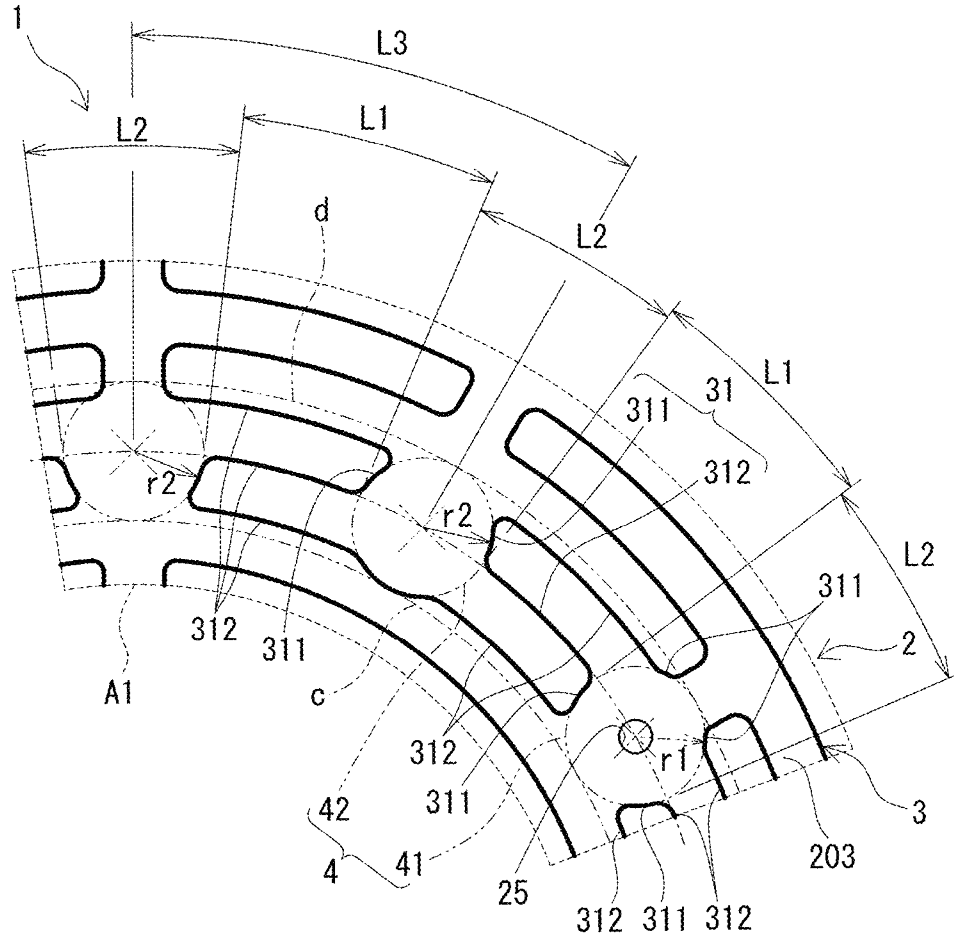
FIG. 2 is a plan view illustrating blank areas of the heater according to the first embodiment.
Figure 3:
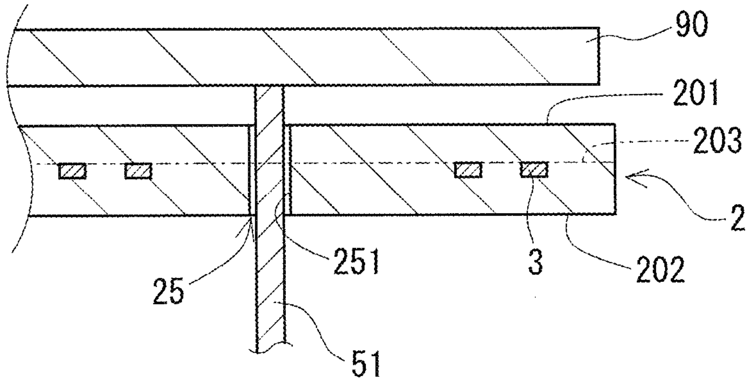
FIG. 3 is a sectional view of the heater of FIG. 1 taken along line (III)-(III).

Referring to FIGS. 1 to 3, a heater 1 of the first embodiment will be described. FIG. 1 is a schematic plan view of the heater 1 according to the first embodiment. FIG. 1 illustrates a third surface 203 of a base 2 on which a heat generator 3 is disposed, as seen in a direction perpendicular to a first surface 201 (FIG. 3) from the first surface 201 side. In the following description, the first surface 201 side of the base 2 may be referred to as "up", and a second surface 202 side opposite thereto may be referred to as "down". FIG. 2 is an enlarged plan view illustrating a sectoral area A1 surrounded by a broken line in FIG. 1. FIG. 3 is a sectional view of the heater 1 of FIG. 1 taken along line (III)-(III). FIG. 3 shows a section of the heater 1 that is cut in the up-down direction. The thickness of the base 2, the thickness of the heat generator 3, and the like in FIG. 3 are schematically shown, and do not necessarily correspond to the actual thicknesses. The thickness refers to a length in the up-down direction.

The heater 1 of the present embodiment includes the base 2 and the heat generator 3. The base 2 has the first surface 201 and the second surface 202 (FIG. 3). A heating target 90 is to be placed on the first surface 201. The second surface 202 is provided on a side opposite to the first surface 201. The heat generator 3 is disposed on the third surface 203 parallel to the first surface 201 of the base 2. Here, the third surface 203 is positioned on the first surface 201 side of the heat generator 3. The third surface 203 is positioned at a distance from the first surface 201. There are a case where the second surface 202 and the third surface 203 are surfaces that differ from each other and a case where the second surface 202 and the third surface 203 are surfaces that are the same as each other. In the heater 1 of the present embodiment, the second surface 202 and the third surface 203 differ from each other. In a second embodiment described below, the second surface 202 and the third surface 203 are the same as each other, that is, the second surface 202 is also the third surface 203. In the case where the second surface 202 and the third surface 203 differ from each other, there are a case where the third surface 203 is an imaginary surface and a case where the third surface 203 is a real surface. In the present embodiment, the third surface 203 is an imaginary surface in the base 2. In a third embodiment described below, the third surface 203 is a real surface.

The base 2 includes a hole portion 25 that opens in at least the second surface 202. In the example illustrated in FIG. 3, the hole portion 25 is a through-hole 251 that opens in both of the first surface 201 and the second surface 202. The heat generator 3 is disposed on the third surface 203 of the base 2. The heat generator 3 includes a plurality of arc-shaped heat-generating portions extending in the circumferential direction of a predetermined circle and a plurality of heat-generating portions that connect the arc-shaped heat-generating portions to each other in the radial direction of the circle. A heat-generating circuit is formed by a combination of the arc-shaped heat-generating portions and the heat-generating portions that connect the arc-shaped heat-generating portions. The predetermined circle is a circle that is centered at the center a of the envelope circle of the heat generator 3 in the third surface 203. In the present embodiment, the center of the circumcircle b of the base 2 is also the center a (FIG. 1). The center a is shown by a black dot in FIG. 1. The circumcircle b is shown by a large two-dot-chain-line circle in FIG. 1. For convenience of description, the circumcircle b, which is shown by the two-dot chain line in FIG. 1, is illustrated to be larger than the real circumcircle of the base 2 shown in FIG. 1.

One of the features of the heater 1 of the present embodiment is that the third surface 203 includes a predetermined plurality of blank areas 4. The plurality of blank areas 4 are regions on each of which the heat generator 3 is not present on a circumference that is centered at the center a and each of which is defined as a region that satisfies the following conditions. The plurality of blank areas 4 are arranged at regular intervals on the circumference. The plurality of blank areas 4 include a first blank area 41 and a second blank area 42. The first blank areas 41 surrounds a region that the hole portion 25 overlaps in a direction perpendicular to the third surface 203. The second blank area 42 is a blank area other than the first blank area 41 and does not include a region that the hole portion 25 overlaps. Hereafter, each element will be described in detail.

[Base]

Figure 5:
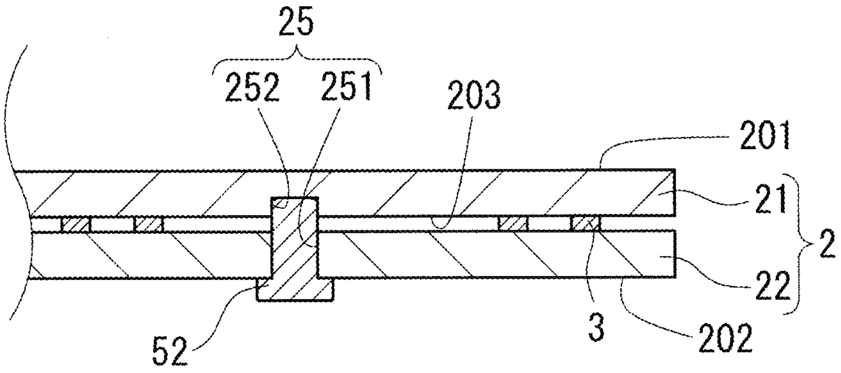
FIG. 5 is a schematic sectional view of a heater according to a third embodiment.

The heating target 90 is to be placed on the base 2. An example of the heating target 90 is a wafer such as a semiconductor wafer. In the present embodiment, the base 2 is composed of a single member. The base 2 may be composed of a plurality of members, as will be described in the third embodiment with reference to FIG. 5. An example of a base 2 that is composed of a plurality of members is a base 2 that is composed of a first base 21 and a second base 22 (FIG. 5). In the present embodiment, the base 2 is disk-shaped. That is, the center a is also the center of the base 2. The first surface 201 of the base 2 is flat. If the heating target 90 is a wafer, the first surface 201 is a surface on which the wafer is to be placed. In the present embodiment, as shown by a dotted line in FIG. 1, the first surface 201 is composed of one zone 20*a*. The zone 20*a* refers to a segment on the first surface 201 including a unit of heat-generating circuit whose temperature is independently controllable. That is, the number of the zones 20*a* corresponds to the number of heat-generating circuits whose temperatures are independently controllable. When the number of the zone 20*a* is one as in the present embodiment, the heat generator 3 is composed of one heat-generating circuit. For convenience of description, the zone 20*a* shown by a dotted line in FIG. 1 is illustrated to be larger than the first surface 201 shown in FIG. 1. The first surface 201 may be composed of a plurality of zones 20*a*, as will be described in a sixth embodiment with reference to FIG. 11.

Examples of the material of the base 2 include known ceramics and metals. Examples of ceramics include aluminum nitride and silicon carbide. Examples of metals include aluminum, aluminum alloys, copper, and a copper alloys. Alternatively, the base 2 may be made of a composite material composed of a metal such as aluminum and any of the aforementioned ceramics. In the present embodiment, the material of the base 2 is ceramics.

A plurality of hole portions 25 are formed in the base 2. Each hole portion 25 forms a space that allows a member to be inserted thereinto, allows a gas to flow, or allows a member to be accommodated. In a see-through view of the base 2 from the upward direction, each hole portion 25 is the outline of an interface formed in the base 2. The interface may be an interface between the base 2 and a space such as a hole, or may be an interface between the base 2 and a member inserted into a hole. The outline of the interface forms a closed figure. The heat generator 3 is not present in each hole portion 25, and each hole portion 25 is separated from the heat generator 3.

The plurality of the hole portions 25 are formed at positions corresponding to a circumference that is centered at the center a. The expression "the hole portions 25 are located at positions corresponding a circumference" means that regions that the hole portions 25 overlap in the direction perpendicular to the third surface 203 are positioned on the circumference. The region that each hole portion 25 overlaps is, for example, a crossing region where the hole portion 25 crosses the third surface 203 or a projection region onto which the hole portion 25 is projected toward the third surface 203. The crossing region refers to a region of the third surface 203 that is surrounded by the inner peripheral surface or the opening edge of the hole portion 25. The projection region is defined as follows. A cylindrical inner peripheral surface of the hole portion 25 that extends in the direction perpendicular to the third surface 203 and that is nearest to the third surface 203 is extended in the direction perpendicular to the third surface 203. In doing so, the inner peripheral part is extended so that the extended inner peripheral surface crosses the third surface 203. The projection region is defined as a region of the third surface 203 surrounded by the extended inner surface. That is, when an inner peripheral circle of the hole portion 25 that is nearest to the third surface 203 is moved in the direction perpendicular to the third surface 203, the projection region corresponds to a region surrounded by the moved inner peripheral circle on the third surface 203. The position of the hole portion 25 in the up-down direction in the base 2 is not particularly limited. The expression "the plurality of the hole portions 25 are located at positions corresponding to a circumference that is centered at the center a" means that the centroids of all hole portions 25 are located at positions substantially corresponding to the same circumference. The centroid of each hole portion 25 is a centroid of a region formed by the outline of a region that is assumed to be uniform when the region that the hole portion 25 overlaps is determined in a plane. If the shape of the region is a circle, the centroid coincides with the center of the circle. The centroid of the hole portion 25 refers to the centroid of the area of the crossing region of the third surface 203 or the centroid of the area of the projection region. For example, if the shape of each hole portion 25 is circular when the heater 1 is seen in the direction perpendicular to the first surface 201, the centers of all hole portions 25 are located at positions substantially corresponding to the same circumference.

In the present embodiment, each hole portion 25 is the through-hole 251 extending through the base 2 in the up-down direction. That is, the openings of the through-hole 251 are formed in the first surface 201 and the second surface 202 of the base 2. For example, as will be described in a fourth embodiment with reference to FIG. 6, the hole portion 25 may be a blind hole 252 that opens only in the second surface 202 of the base 2 and does not extend through the base 2 in the up-down direction. The through-hole 251 has a part that crosses the third surface 203. That is, the through-hole 251 has a part that is positioned on the same plane as the third surface 203. There are a case where the blind hole 252 has a part that is positioned on the same plane as the third surface 203 and a case where the blind hole 252 is provide so as to be displaced relative to the third surface 203 in the up-down direction. In the latter case, the blind hole 252 does not have a part that crosses the third surface 203. That is, the blind hole 252 does not have a part that is positioned on the same plane as the third surface 203.

The through-hole 251 is used, for example, to insert a lifter pin 51 as in the present embodiment. The lifter pin 51 supports the heating target 90. A lower end part of the lifter pin 51 is connected to an elevation mechanism (not shown). The elevation mechanism can move the lifter pin 51 in the up-down direction so that the lifter pin 51 can protrude from and retract into the first surface 201. The through-hole 251 is used also as an air suction path and an air discharge path, although illustration is omitted. The air suction path is used to evacuate the space between the heating target 90 and the first surface 201. Due to the evacuation, for example, the heating target 90 is attached to the first surface 201 by suction. The air discharge path is used for the purposes of cooling the heating target 90, supplying a gas needed as heating atmosphere, and the like.

The number of the hole portions 25 may be selected from any appropriately numbers in accordance with the use of the hole portions 25. As in the present embodiment, if the hole portions 25 are the through-holes 251 through which the lifter pins 51 are to be inserted, the number of the through-holes 251 is usually three. In the present embodiment, the three through-holes 251 are provided at regular intervals in the circumferential direction of the base 2. That is, in the present embodiment, the distances between the through-holes 251 that are adjacent to each other in the circumferential direction are uniform. The three through-holes 251 may be provided at irregular intervals in the circumferential direction. That is, the distances between the adjacent through-holes 251 may be nonuniform.

The shape of the hole portion 25 is not particularly limited and may be selected from any appropriate shapes. The shape of the hole portion 25 refers to the shape when the heater 1 is seen in the direction perpendicular to the first surface 201. The shape of the hole portion 25 in the present embodiment is circular. Each hole portion 25 has at least one cylindrical inner peripheral surface that crosses the third surface 203. Examples of the hole portion 25 having one cylindrical inner peripheral surface include a hole whose inside diameter is uniform in the up-down direction and a hole whose inside diameter gradually increases from an upper part toward a lower part thereof. That is, in the former example, the inner peripheral surface of the hole portion 25 has a cylindrical shape. In the latter example, the inner peripheral surface of the hole portion 25 has a hollow conical-frustum shape. An example of the hole portion 25 having two or more cylindrical inner peripheral surfaces is a stepped hole in which two inner peripheral surfaces having different inside diameters are formed so as to be arranged in the up-down direction. In the present embodiment, the hole portion 25 is a hole that has one cylindrical inner peripheral surface and whose inside diameter is uniform in the up-down direction.

[Heat Generator]

The heat generator 3 functions as a heat source for heating the heating target 90 via the base 2. As illustrated in FIG. 3, in the present embodiment, the heat generator 3 is embedded in the base 2. Because the heat generator 3 is embedded in the base 2, the heater 1 of the present embodiment can transfer substantially the entire heat generated by the heat generator 3 to the base 2. As will be described in the second embodiment with reference to FIG. 4, the heat generator 3 may be fixed to the second surface 202 of the base 2. As will be described in a third embodiment with reference to FIG. 5, the heat generator 3 may be interposed between a plurality of members of the base 2, that is, between the first base 21 and the second base 22.

The material of the heat generator 3 is not particularly limited, as long as the material can heat the heating target 90 to a desirable temperature. An example of the material of the heat generator 3 is a known metal that is suitable for resistance heating. The metal is, for example, a metal selected from the group consisting of a stainless steel, nickel, a nickel alloy, silver, a silver alloy, tungsten, a tungsten alloy, molybdenum, a molybdenum alloy, chrome, and a chrome alloy. An example of a nickel alloy is nichrome. As in the third embodiment described below, the heat generator 3 may include a body made of the metal and a coating that is made of a resin and that covers a region of the outer periphery of the body that is in contact with the base 2. Illustration of the coating is omitted. Examples of the shape of the heat generator 3 include a foil-like shape and a linear shape. The shape of the heat generator 3 refers to the shape of the body if the heat generator 3 includes a coating. In the present embodiment, the shape of the heat generator 3 is a foil-like shape.

The wiring pattern of the heat generator 3 is not particularly limited, and may be selected from any appropriate patterns in accordance with heating temperature and required temperature distribution. In the wiring pattern of the heat generator 3, the plurality of blank areas 4 described below are provided. The blank areas 4 are non-heating portions in which the heat generator 3 is not present. The wiring pattern of the heat generator 3 illustrated in FIG. 1 is an example for facilitating description.

The heat generator 3 includes a middle portion 31 (FIG. 2). The middle portion 31 is formed between each pair of the blank areas 4 that are adjacent to each other in the circumferential direction. Hereafter, the blank areas 4 that are adjacent to each other in the circumferential direction may be simply referred to as "the adjacent blank areas 4". Because the middle portion 31 of the heat generator 3 is formed between the adjacent blank areas 4, it is easy to make the temperature difference in the radial direction of the base 2 small, compared with a case where the heat generator 3 is not provided over the entire region between the adjacent blank areas 4. Thus, it is easy to make the temperature of the base 2 in the radial direction uniform. The expression "between each pair the blank areas 4 that are adjacent to each other in the circumferential direction" means "between the inscribed circle c and the circumcircle d of the plurality of blank areas 4 and between each pair of the blank areas 4 that are adjacent to each other in the circumferential direction". As shown by two-dot chain lines in FIG. 2, the inscribed circle c and the circumcircle d are respectively a circle that is in contact with the inner peripheral side of the plurality of blank areas 4 and a circle that is in contact with the outer peripheral side of the plurality of blank areas 4. The inscribed circle c and the circumcircle d are circles centered at the center a. The expression "a case where the heat generator 3 is not provided over the entire region between the adjacent blank areas 4" refers to a case where the heat generator 3 is not provided in an annular region that includes all of the blank areas 4. The annular region refers to the entire region surrounded by the inscribed circle c and the circumcircle d.

The middle portion 31 includes a first middle portion 311 and a second middle portion 312. The first middle portion 311 and the second middle portion 312 are formed so as to be continuous with each other. The first middle portion 311 is in contact with an edge part of each of the blank areas 4. The first middle portion 311 has an arc shape along the outline of the blank area 4. Therefore, the temperature of a region near the blank area 4 does not easily decrease. In the present embodiment, a plurality of first middle portions 311 are provided at edge parts of each of the first blank areas 41 and the second blank areas 42. The second middle portion 312 has an arc shape in the circumferential direction. It is easy to make the temperature difference in the circumferential direction small because the second middle portion 312 has an arc shape in the circumferential direction and thus the temperature difference between a region between the blank areas 4 and a region near the blank area 4 does not easily increase, compared with a case where the second middle portion 312 extends in the radial direction of the base 2. The second middle portion 312 is not in contact with an edge part of the blank area 4. In the present embodiment, a plurality of second middle portions 312 are provided between each pair of the adjacent blank areas 4.

[Terminal]

Electric power is supplied to the heat generator 3 through terminals 80 (FIG. 1). The number of the terminals 80 may be selected from any appropriate numbers in accordance with the number of the zones 20*a* in the first surface 201, that is, the number of the heat-generating circuits of the heat generator 3. The number of the terminals 80 is usually an even number. In the present embodiment, because the number of the heat-generating circuit is one, the number of the terminals 80 is two. The two terminals 80 are disposed so as to face each other with the center a therebetween on the innermost side of the heat generator 3 in the radial direction. Each terminal 80 is drawn out from the second surface 202 of the base 2 via a connection member or the like (not shown). An example of the material of each terminal 80 is a material that is the same as the material of the heat generator 3.

[Blank Area]

Each blank area 4 is an area where the heat generator 3 is not present (FIGS. 1 and 2). In FIGS. 1 and 2, for convenience of description, each blank area 4 is shown by a small two-dot-chain-line circle. Each blank area 4 is formed by avoiding placement of the wiring pattern of the heat generator 3. The centers of the plurality of blank areas 4 are arranged at regular intervals on a circumference that is centered at the center a in the third surface 203.

The expression "the centers of the plurality of blank areas 4 are arranged on a circumference" means, not in a strict sense, that the centers may be arranged practically on the circumference. The expression "arranged substantially on the circumference" means that the centers of all of the blank areas 4 need not be arranged on the same circumference, as long as the temperature difference in the circumferential direction of the base 2 falls within a design range. For example, for a reference circle centered at the center a, the center of each blank area 4 may be disposed in a region that is 90% or more and 110% or less of the diameter of the reference circle. The reference circle is defined as a circle having a diameter that is the average of the diameters of all circles that are centered at the center a and each of which passes through the center of each blank area 4. Needless to say, preferably, the centers of all of the blank areas 4 are arranged on the same circumference.

The regular intervals refer to, not in a strict sense, substantially regular intervals. The expression "substantially regular intervals" means that all separation distances along a straight line connecting the centers of the adjacent blank areas 4 need not be equal, as long as temperature difference in the circumferential direction of the base 2 falls within a designed range. For example, each separation distance is within ±10% of the average value of the separation distances. Needless to say, preferably, all of the separation distances are equal. The adjacent blank areas 4 do not overlap each other. As described above, the middle portion 31 of the heat generator 3 is provided between the adjacent blank areas 4. That is, the plurality of blank areas 4 are sporadically present on the same circumference.

The distance L1 between the blank areas 4 that are adjacent to each other on the circumference on which the centers of the plurality of blank areas 4 are arranged is greater than or equal to the length L2 of one of the blank areas 4 on the circumference (FIG. 2). The distance L1 and the length L2 are each an arc length. It is easy to provide the middle portion 31 between each pair of the adjacent blank areas 4, because the distance L1 is greater than or equal to the length L2. Therefore, it is easy to make the temperature of the base 2 in the radial direction uniform. More preferably, the distance L1 is greater than the length L2, and further preferably, is greater than or equal to 1.5 times the length L2. For example, the distance L1 is preferably less than or equal to three times the length L2. If the distance L1 is less than or equal to three times the length L2, the distance between the adjacent blank areas 4 is not too large. Therefore, the temperature difference between a region between the adjacent blank areas 4 and a region near the blank area 4 does not easily become large. Thus, it is easy to make the temperature difference in the circumferential direction of the base 2 small. More preferably, the distance L1 is less than or equal to twice the length L2.

Each of the plurality of blank areas 4 constitutes either one of the first blank areas 41 and the second blank areas 42.

(First Blank Area)

The first blank area 41 is a region that is provided out of necessity to keep a predetermined distance between the hole portion 25 and the heat generator 3 in view of electrical insulation and the like, because the hole portion 25 is formed in the base 2. Therefore, electrical insulation between a member provided in the hole portion 25 and the base 2 is ensured. The first blank area 41 is a circular region including a region that the hole portion 25 overlaps in the direction perpendicular to the third surface 203. An example of the region that the hole portion 25 overlaps is the aforementioned crossing region or projection region.

The position of the center of the first blank area 41 is located at a position that overlaps the centroid of the hole portion 25 (FIG. 2). In the present embodiment, because the shape of the hole portion 25 when the heater 1 is seen from the upward direction is circular, the position of the center of the first blank area 41 is a position that overlaps the center of the hole portion 25. The radius r1 of the first blank area 41 is the shortest distance between the centroid of the region that the hole portion 25 overlaps and an edge of the heat generator 3. That is, in the present embodiment, the radius r1 of the first blank area 41 is the shortest distance between the axis of the hole portion 25 and the edge of the heat generator 3. The number of the first blank areas 41 is equal to the number of the hole portions 25 (FIG. 1). That is, the number of the first blank areas 41 in the present embodiment is three. In the present embodiment, the three first blank areas 41 are provided at regular intervals in the circumferential direction.

(Second Blank Area)

The second blank area 42 is a region in which placement of the heat generator 3 is intentionally avoided, although it is possible to place the heat generator 3, in order to make the temperature of the base 2 in the circumferential direction uniform. The second blank area 42 is a circular region that does not overlap the region that the hole portion 25 overlaps. That is, the second blank area 42 does not overlap the hole portion 25 of the base 2. The position of the center of the second blank area 42 is located on a circumference that connects the centers of the first blank areas 41 to each other in the circumferential direction. The radius r2 of the second blank area 42 is equal to the radius r1 of the first blank area 41. Here, the expression "the radii are equal" means, not in a strict sense, that the radii may be substantially equal. The expression "substantially equal" means that all radii r2 of the second blank areas 42 need not be equal as long as the temperature difference in the circumferential direction of the base 2 falls within a designed range. For example, the radius r2 of the second blank area 42 may be within ±10% of the radius r1 of the first blank area 41. Needless to say, preferably, all of the radii r2 of the second blank areas 42 are equal.

The number of the second blank areas 42 may be selected from any appropriate numbers in accordance with: the number of the first blank areas 41; the distance from the center of the heat generator 3 in the first blank area 41; the distance L3 between the centers of the second blank areas 42 that are adjacent to each other on a circumference on which the centers of the plurality of blank areas 4 are arranged; the center-to-center distance between the adjacent first blank areas 41; and the like. The distance L3 is an arc length. The center-to-center distance is a linear distance. The larger the number of the second blank areas 42, the temperature difference in the circumferential direction of the base 2 tends to be small. However, if the number of the second blank areas 42 is too large, a temperature difference in the radial direction of the base 2 may occur.

The number of the second blank areas 42 is preferably a number such that the distance L3 between the centers of the second blank areas 42 that are adjacent to each other on a circumference on which the centers of the plurality of blank areas 4 are arranged is greater than or equal to twice the length L2 of one of the second blank areas 42 on the circumference. The number of the second blank areas 42 is preferably a number such that the center-to-center distance between the adjacent second blank areas 42 is greater than or equal to four times the radius r2 of the second blank area 42. The reason for this is that it is easy to provide the middle portion 31 of the heat generator 3 between the adjacent blank areas 4 and it becomes easy to design the wiring pattern of the heat generator 3 that makes the temperature of the base 2 in the radial direction uniform. The number of the second blank areas 42 is more preferably a number such that the distance L3 is greater than or equal to 2.5 times the length L2. The number of the second blank areas 42 is more preferably a number such that the center-to-center distance between the adjacent second blank areas 42 is greater than or equal to five times the radius r2 of the second blank area 42. Here, the expression "the adjacent second blank areas 42" means the second blank areas 42 that are disposed with none of the first blank areas 41 therebetween.

The number of the second blank areas 42 is preferably a number such that the distance L3 is less than or equal to four times the length L2. The number of the second blank areas 42 is preferably a number such that the center-to-center distance between the adjacent second blank areas 42 is less than or equal to eight times the radius r2 of the second blank area 42. The reason for this is that it is easier to design the wiring pattern of the heat generator 3 in order to make the temperature difference in the circumferential direction of the base 2 small. The number of the second blank areas 42 is more preferably a number such that the distance L3 is less than or equal to three times the length L2. The number of the second blank areas 42 is more preferably a number such that the center-to-center distance between the adjacent second blank areas 42 is less than or equal to six times the radius r2 of the second blank area 42.

The number of the second blank areas 42 is preferably greater than or equal to twice the number of the first blank areas 41, and more preferably, greater than or equal to three times the number of the first blank areas 41. The reason for this is that it is easier to design the wiring pattern of the heat generator 3 in order to make the temperature difference in the circumferential direction of the base 2 small. The number of the second blank areas 42 is preferably less than or equal to six times the number of the first blank areas 41, and more preferably, less than or equal to four times the number of the first blank areas 41. This is because it is easier to design the wiring pattern of the heat generator 3 since the number of the second blank areas 42 is not too large.

As described above, the number of the first blank areas 41 of the present embodiment is three. The three first blank areas 41 are provided at regular intervals in the circumferential direction. A shape that is formed by connecting the centers of the adjacent first blank areas 41 is a regular triangle. In this case, the number of the second blank areas 42 is preferably a multiple of 3. That is, the number of the second blank areas 42 is, for example, three, six, nine, or the like. In these cases, shapes that are formed by connecting the centers of the adjacent blank areas 4 are respectively a regular hexagon, a regular nonagon, and a regular dodecagon. The number of the second blank areas 42 of the present embodiment is nine.

There may be a case where, although the number of the first blank areas 41 is three as with the present embodiment, in contrast to the present embodiment, the three first blank areas 41 are not provided at regular intervals in the circumferential direction and a shape formed by connecting the centers of the adjacent first blank areas 41 is an isosceles triangle. In this case, the number of the second blank areas 42 is, for example, two, four, five, seven, or the like. In these cases, shapes that are formed by connecting the centers of the adjacent first blank areas 4 are respectively a regular pentagon, a regular heptagon, a regular octagon, and a regular decagon.

At least one of the first blank area 41 and the second blank area 42 preferably includes, for example, three or more contact portions that are in contact with the heat generator 3. Needless to say, the number of contact portions where the first blank area 41 is in contact with the heat generator 3 and the number of contact portions where the second blank area 42 is in contact with the heat generator 3 are each preferably three or more. If the number of the contact portions is three or more, the temperature of a region near the blank area 4 does not easily decrease. The number of the contact portions is more preferably four or more. Then number of the contact portions is preferably, for example, eight or less. If the number of the contact portions is eight or less, the temperature of a region near the blank area 4 does not excessively increase. The number of the contact portions is more preferably seven or less, and further preferably six or less. In the present embodiment, each of the first blank areas 41 includes four contact portions that are in contact with the heat generator 3. Regarding the second blank areas 42, there are second blank areas 42 each including three contact portions in contact with the heat generator 3 and second blank areas 42 each including four contact portions in contact with the heat generator 3.

[Manufacturing]

The heater 1 of the present embodiment can be manufactured, for example, by using a combination of a screen-printing method and a hot-press bonding method. Two ceramic substrates and a screen mask on which the heat generator 3 can be transferred are prepared. As the screen mask, a screen mask that can make a wiring pattern for forming the aforementioned plurality of blank areas 4 is used. The screen mask is placed on one of the ceramic substrates. A paste to become the heat generator 3 is applied to the ceramic substrate on which the screen mask is placed. The heat generator 3 is transferred to the ceramic substrate by using a squeegee. After the heat generator 3 has been transferred, the screen mask is removed. The surface to which the heat generator 3 has been transferred and the other ceramic substrate are affixed and bonded to each other by hot pressing. Due to the bonding, the heat generator 3 can be embedded in the base 2. Subsequently, the hole portions 25 are formed at predetermined positions in the base 2 by performing a hole-forming process. If the hole portions 25 are the through-holes 251, the hole-forming process is performed over the entire length of the base 2 in the thickness direction.

Alternatively, the heater 1 of the present embodiment can be manufactured through a process including: a step of preparing the heat generator 3; a step of making the base 2 in which the heat generator 3 is embedded; and a step of forming the hole portions 25. Preparation of the heat generator 3 can be performed by bending a metal wire. Bending of a metal wire is performed to make a wiring pattern for forming the aforementioned plurality of blank areas 4. Making of the base 2 in which the heat generator 3 is embedded can be performed by the following process. A mold is filled with material powder, including powder composed of the material of the base 2, and the heat generator 3. The material powder may include a sintering agent, a binder, and the like, as necessary. The material powder in the mold is press-formed. Due to the press-forming, a powder compact in which the heat generator 3 is embedded is made. The powder compact is sintered. Forming of the hole portions 25 can be performed by performing a hole-forming process at predetermined positions in the powder compact or the base 2.

[Advantageous Effects]

With the heater 1 of the present embodiment, it is easy to make the temperature of the base 2 in the circumferential direction uniform. This is because the plurality of blank areas 4 in which the heat generator 3 is not present are arranged on the same circumference at substantially regular intervals. The heater 1 of the present embodiment usually includes, in addition to the first blank areas 41, the second blank areas 42, each having a size that is equivalent to that of the first blank area 41, in the circumferential direction of the heater 1. Therefore, the distance between the adjacent blank areas 4 is small. Thus, even though the heat generator 3 is formed between the adjacent blank areas 4, the temperature difference between a region between the adjacent blank areas 4 and a region near the blank area 4 does not easily become large, and the temperature difference in the circumferential direction of the base 2 can be made small. The heater 1 of the present embodiment, with which it is easy to make the temperature of the base 2 in the circumferential direction uniform as described above, can be appropriately used as a heater for heating a wafer, for which it is required that the temperature difference in the circumferential direction of the base 2 be extremely small. Moreover, with the heater 1 of the present embodiment, it is easy to make the temperature of the base 2 in the radial direction uniform. This is because the heat generator 3 has the middle portion 31 that is formed between the adjacent blank areas 4. With the middle portion 31, it is easy to make the temperature difference in the radial direction small, compared with a case where the heat generator 3 is disposed along the entire periphery of the same circumference on which the plurality of blank areas 4 are formed.

Second Embodiment

[Heater]

Figure 4:
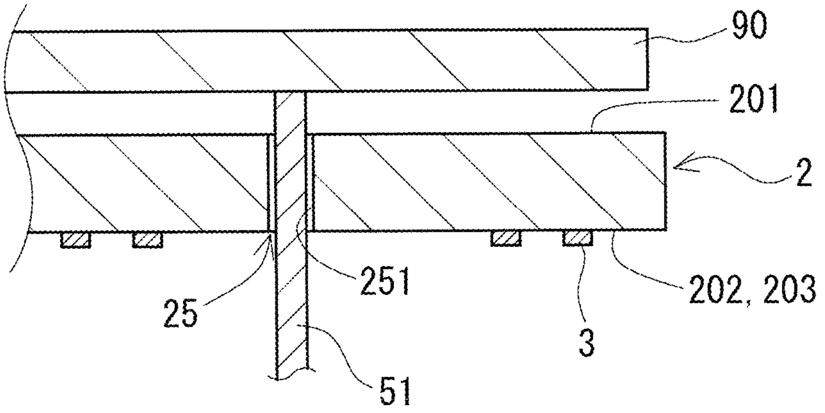
FIG. 4 is a schematic sectional view of a heater according to a second embodiment.

As illustrated in FIG. 4, with a heater of the second embodiment, the heat generator 3 can be fixed to the second surface 202 of the base 2. That is, in the present embodiment, the second surface 202 is also the third surface 203. FIG. 4 is a sectional view taken at a position that is the same as that of the section view shown in FIG. 3. The same applies to FIG. 5 and FIG. 6, which will be referred to in the third embodiment and the fourth embodiment described below. The heat generator 3 may be made from a metal foil. The heater of the present embodiment is the same as the heater 1 of the first embodiment except that the heat generator 3 is set on the second surface 202 of the base 2 and that the shape of the heat generator 3 is foil-like. Description of the configuration of the present embodiment that is the same as that of the first embodiment will be omitted.

[Manufacturing]

The heater can be manufactured, for example, through a process including: a step of making the base 2; a step of forming the hole portions 25; and a step of forming the heat generator 3. Making of the base 2 can be performed by making a powder compact by press-forming the material powder of the base 2, with which a mold is filled, and by sintering the powder compact. Forming of the hole portions 25 can be performed by powder molding or by performing a hole-forming process on the base 2. Forming of the heat generator 3 can be performed by printing an electroconductive paste having a predetermined wiring pattern on the second surface 202 of the base 2 so that the aforementioned plurality of blank areas 4 are formed and by sintering the electroconductive paste. Forming of the heat generator 3 may be performed before or after the hole-forming process. In the present embodiment, a case where the heat generator 3 is only a metal foil has been described. However, an integrated heat generator sheet in which a metal foil is affixed to a resin film or in which a metal foil is interposed between resin films may be used. By using a heat generator sheet, it becomes easy to handle the sheet during manufacturing.

[Advantageous Effects]

With the heater of the present embodiment, it is easy to make the temperature of the base 2 in the circumferential direction and the radial direction uniform, as with the first embodiment. Moreover, with the heater of the present embodiment, it is easy to form the heat generator 3 because the heat generator 3 is fixed to the second surface 202 of the base 2, compared with a case where the heat generator 3 is embedded in the base 2. Furthermore, with the heater of the present embodiment, it is easy to provide the terminals 80 (FIG. 1) at end portions of the heat generator 3, because the heat generator 3 is not embedded in the base 2 and is exposed from the base 2.

Third Embodiment

[Heater]

A heater of a third embodiment will be described with reference to FIG. 5. The heater of the present embodiment differs from the heater 1 of the first embodiment in the following respects: the base 2 includes a plurality of members; the hole portion 25 is composed of the through-hole 251 and the blind hole 252; a member disposed in the hole portion 25 is not the lifter pin 51 but is a fastening member 52; and the heat generator 3 includes a body and a coating. In the following description, the differences from the first embodiment will be mainly described. Description of the configuration that is the same as that of the first embodiment will be omitted. The same applies to a fourth embodiment described below.

[Base]

The base 2 is composed of two members, which are the first base 21 and the second base 22. The upper surface of the first base 21 is the first surface 201. The second base 22 is disposed so as to face the lower surface of the first base 21. The lower surface of the second base 22 is the second surface 202. The heat generator 3 is interposed between the first base 21 and the second base 22. The surface of the first base 21 facing the second base 22 and the surface of the second base 22 facing the first base 21 each constitute the third surface 203. The shape of the first base 21 and the second base 22 is, for example, a disk-like shape. The materials of the first base 21 and the second base 22 may be the same or may different. In a case where the materials are different, for example, the material of one of the first base 21 and the second base 22 is a metal and the material of the other is ceramics. In the present embodiment, the material of the first base 21, having the first surface 201, is a metal; and the material of the second base 22, having the second surface 202, is ceramics.

The first base 21 and the second base 22 are fixed to each other by using the fastening member 52. The fastening member 52 is, for example, a bolt. The hole portion 25 of the present embodiment includes the blind hole 252 formed in the first base 21 and the through-hole 251 formed in the second base 22. The blind hole 252 opens in the surface of the first base 21 facing the second base 22. In the inner peripheral surface of the blind hole 252, a screw groove, into which the bolt is to be screwed, is formed. Illustration of the screw groove is omitted. The through-hole 251 is formed at a position facing the blind hole 252. That is, the blind hole 252 and the through-hole 251 communicate each other. The diameter of the through-hole 251 is uniform in the axial direction thereof. A spot facing may be formed in a part of the through-hole 251 adjacent to the second surface 202 of the second base 22. The shape and size of the spot facing preferably correspond to the shape and size of the head of the bolt. The size of the spot facing refers to the diameter and depth of the spot facing. The size of the head refers to the diameter and thickness of the head. The fastening method described above is an example, the method of fastening the first base 21 and the second base 22 is not limited to the fastening method described above, and various other methods may be used.

[Heat Generator]

The heat generator 3 may be composed of a body made of a metal and a coating that is made of a resin and that covers a region of the outer periphery of the body that is in contact with the base 2. Illustration of the coating is omitted. Examples of the metal include metals that are the same for those of the heat generator 3 of the first embodiment. Examples of the shape of the body include a metal foil that is cut into a desirable pattern and a foil-like shape formed by drawing a desirable pattern by using a metal paste and drying the metal paste. Examples of the resin include a polyimide resin, a silicone resin, an epoxy resin, and a phenol resin. The shape of the coating is preferably a film that does not impede heat transfer and that can be handled easily.

[Manufacturing]

The heater of the present embodiment can be manufactured by interposing the heat generator 3 between the first base 21 and the second base 22 and by fixing the first base 21 and the second base 22 to each other by using the fastening member 52.

The heat generator 3, which includes the body and the coating, can be made, for example, through the following process. By heat-pressing the metal foil and the first resin film that are superposed on each other, a multi-layer film in which the metal foil and the first resin film are integrated is made. The size of the metal foil and the size of the first resin film may be, for example, the same. A mask having a predetermined pattern is formed on the surface of the metal foil by using a photoresist method. A part of the metal foil exposed from the mask is removed by etching. Therefore, the mask is formed so that a metal foil having a predetermined pattern remains on the resin film and a part from which the metal foil has been removed forms the aforementioned plurality of blank areas 4. By removing the mask, a multi-layer film in which a metal foil having a predetermined pattern is formed is made on the first resin film. A second resin film having the same size as the first resin film is superposed on the metal foil side of the multi-layer film, and heat-pressing is performed. Through the process, the heat generator 3, in which a metal foil having a predetermined wiring pattern is interposed between the first resin film and the second resin film, is made.

The hole portions 25 of the first base 21 and the second base 22 may be formed by individually performing a hole-forming process on each of the first base 21 and the second base 22. Alternatively, the hole portions 25 may be formed by performing a hole-forming process on both of the first base 21 and the second base 22 in a state in which the first base 21 and the second base 22 are superposed on each other. When forming the hole portions 25 in a state in which the first base 21 and the second base 22 are superposed on each other, the hole-forming process may be performed in a state in which the heat generator 3 is interposed between the first base 21 and the second base 22. When a hole-forming process is performed on the first base 21 and the second base 22 in a state in which the heat generator 3, including the body and the coating, is interposed between the first base 21 and the second base 22, holes are formed in the resin film of the heat generator 3.

[Advantageous Effects]

With the heater of the present embodiment, it is easy to make the temperature of the base 2 in the circumferential direction and the radial direction uniform, as with the first embodiment. Moreover, the heater of the present embodiment has high freedom in design, compared with a case where the base 2 is composed of a single member. The reason for this is that, for example, the first base 21 and the second base 22 may be made from different materials.

Fourth Embodiment

[Heater]

Figure 6:
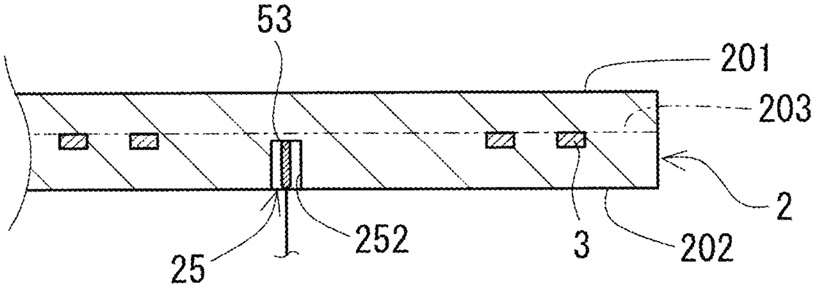
FIG. 6 is a schematic sectional view of a heater according to a fourth embodiment.

A heater 1 of the fourth embodiment will be described with reference to FIG. 6. The heater 1 of the present embodiment differs from the heater 1 of the first embodiment in that the hole portion 25 is not the through-hole 251 but is the blind hole 252 and in that a member provided in the hole portion 25 is not the lifter pin 51 but is a temperature sensor 53.

The opening of the blind hole 252 is formed in the second surface 202 of the base 2. For example, the temperature sensor 53 is disposed inside of the blind hole 252. The type of the temperature sensor 53 is, for example, a thermocouple or a resistance thermometer element. The inside of the blind hole 252 is filled with a sealing material that fixes the temperature sensor 53 to the inside of the blind hole 252. Illustration of the sealing material is omitted. The sealing material is not particularly limited and may be selected from any appropriate sealing materials, as long as the sealing material can withstand a temperature when the heating target 90 is heated. The sealing material is, for example, a silver solder. The heater 1 of the present embodiment can be manufactured through a process that is the same as the process for manufacturing the heater 1 of the first embodiment. The hole-forming process is performed until the hole reaches a middle portion of the base 2 in the thickness direction.

[Advantageous Effects]

With the heater of the present embodiment, it is easy to make the temperature of the base 2 in the circumferential direction and the radial direction uniform, as with the first embodiment. Moreover, with the heater of the present embodiment, it is easy to control the temperature of the base 2, because the heater includes the temperature sensor 53 that can measure the temperature of the base 2.

Fifth Embodiment

[Heater]

A heater 1 of a fifth embodiment will be described with reference to FIGS. 7 to 10. The heater 1 of the present embodiment differs from the heater 1 of the first embodiment mainly in that the hole portion 25 is not the through-hole 251 but is a blind hole 252 (FIGS. 8 and 10) and in that a member disposed in the hole portion 25 is the terminal 80.

Figure 7:
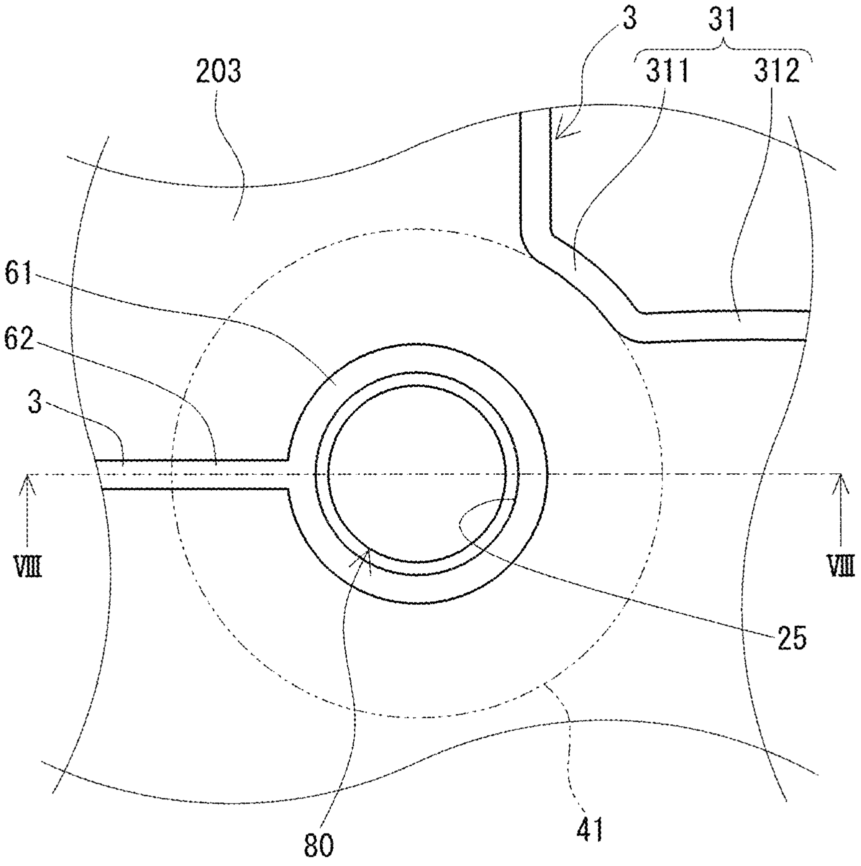
FIG. 7 is a partial schematic plan view of a heater according to a fifth embodiment.
Figure 8:
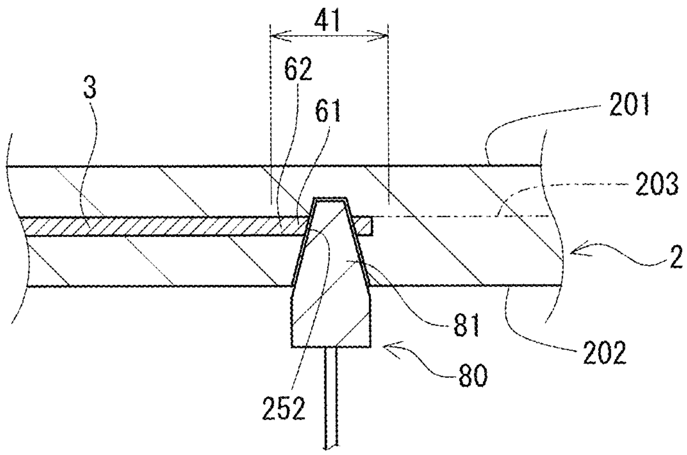
FIG. 8 is a sectional view of the heater of FIG. 7 taken along line (VIII)-(VIII).
Figure 9:
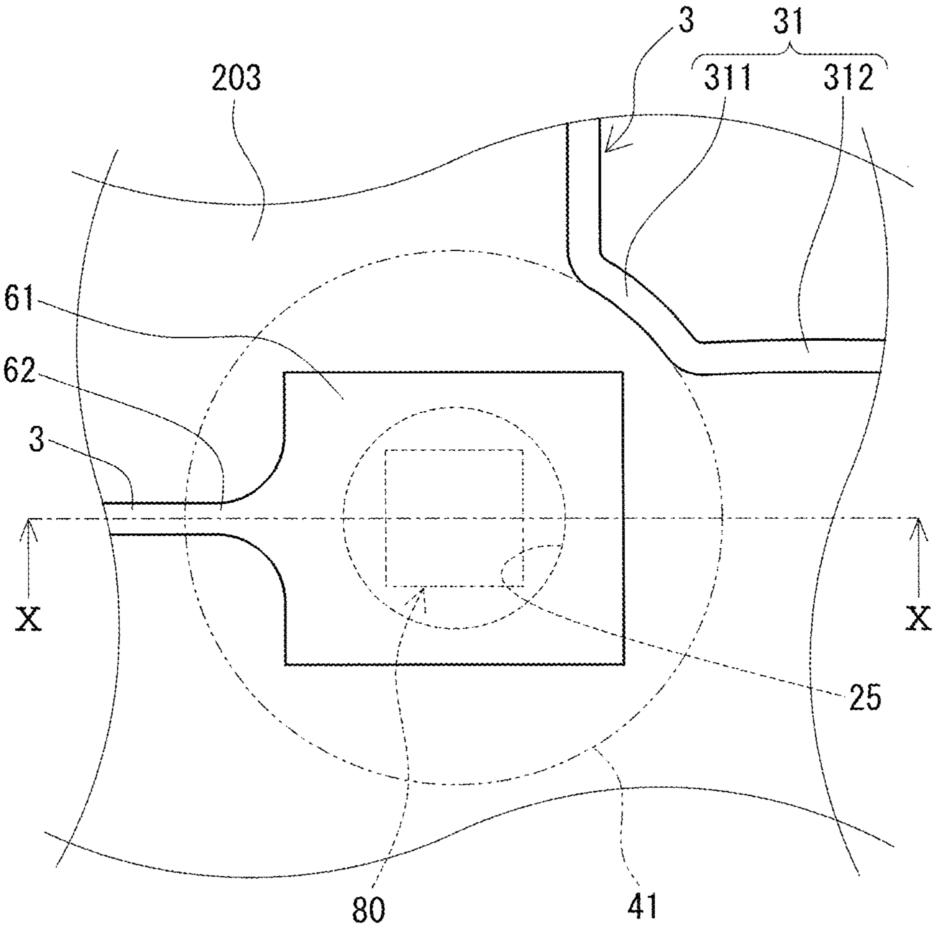
FIG. 9 is a partial schematic plan view of another example of the heater according to the fifth embodiment.
Figure 10:
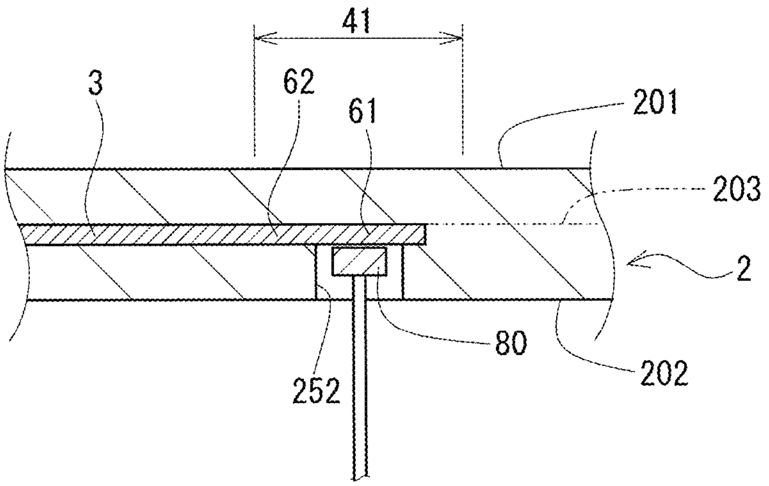
FIG. 10 is a sectional view of the heater of FIG. 9 taken along line (X)-(X).

A first connection portion 61 and a second connection portion 62 are provided on the third surface 203 on which the heat generator 3 is disposed (FIGS. 7 and 9). The terminal 80 is connected to the first connection portion 61. The second connection portion 62 connects the first connection portion 61 and the heat generator 3 to each other. That is, the second connection portion 62 is a part from the first connection portion 61 to a peripheral edge of the first blank area 41. The terminal 80, the first connection portion 61, and the second connection portion 62 are not included in the heat generator 3. This is because the terminal 80, the first connection portion 61, and the second connection portion 62 are small compared with the heat generator 3, and cannot substantially achieve the function required as the heat generator 3. To be specific, the heat-generation density of the terminal 80, the first connection portion 61, and the second connection portion 62 is lower than the heat-generation density of the heat generator 3. The heat-generation density of the terminal 80, the first connection portion 61, and the second connection portion 62 is, for example, less than or equal to ⅓, or further, less than or equal to ⅙ of the heat-generation density of the heat generator 3. In the first connection portion 61, a through-hole facing the hole portion 25 may be provided as illustrated in FIGS. 7 and 8, or the through-hole need not be provided as illustrated in FIGS. 9 and 10. The shape of the first connection portion 61 may be annular as illustrated in FIGS. 7 and 8, or may be rectangular as illustrated in FIGS. 9 and 10.

The opening of the blind hole 252 is formed in the second surface 202 of the base 2 (FIGS. 8 and 10). The terminal 80 is disposed inside of the blind hole 252. The shape of the inner peripheral surface of the blind hole 252 may be selected from any appropriately shapes in accordance with the shape of the terminal 80. The shape of the inner peripheral surface of the blind hole 252 may be, for example, a hollow conical frustum as illustrated in FIG. 8. The inside diameter of the inner peripheral surface, having a hollow conical frustum shape, gradually increases from the upper side toward the lower side. Alternatively, the shape of the inner peripheral surface of the blind hole 252 may be, for example, a cylindrical shape as illustrated in FIG. 10. The inside diameter of the cylindrical inner peripheral surface is uniform in the up-down direction. A metalized layer may be formed on the inner peripheral surface having a hollow conical frustum shape. Illustration of the metalized layer is omitted. The metalized layer has a part that is directly connected to the first connection portion 61. Therefore, the metalized layer can electrically connect the first connection portion 61 and the terminal 80 to each other appropriately. The material of metalized layer is, for example, a material that is the same as the material of the heat generator 3.

The shape of the terminal 80 may be, for example, a columnar shape as illustrated in FIG. 8 or may be a block shape as illustrated in FIG. 10. The terminal 80 having a columnar shape has a tip portion 81 inserted into the hole portion 25. The shape of the tip portion 81 is, for example, a shape corresponding to the shape of the inner peripheral surface of the hole portion 25. That is, the shape of the tip portion 81 in the present embodiment is a conical frustum shape that is tapered toward the distal end. The tip portion 81 is inserted into the hole portion 25 so that the outer peripheral surface the tip portion 81 comes into contact with the inner peripheral surface of the through-hole of the first connection portion 61. The shape of the block-shaped terminal 80 when the first surface 201 is seen in a plan view from the first surface 201 side is rectangular in FIG. 9. However, the shape may be circular. The block-shaped terminal 80 is connected to the lower surface of the first connection portion 61. The material of the terminal 80 is, for example, a material that is the same as the material of the heat generator 3. A method of connecting the terminal 80 to the first connection portion 61 is not particularly limited, and may be selected from any appropriately methods, and a known method may be used.

[Advantageous Effects]

With the heater of the present embodiment, it is easy to make the temperature of the base 2 in the circumferential direction and the radial direction uniform, as with the first embodiment.

Sixth Embodiment

[Heater]

Figure 11:
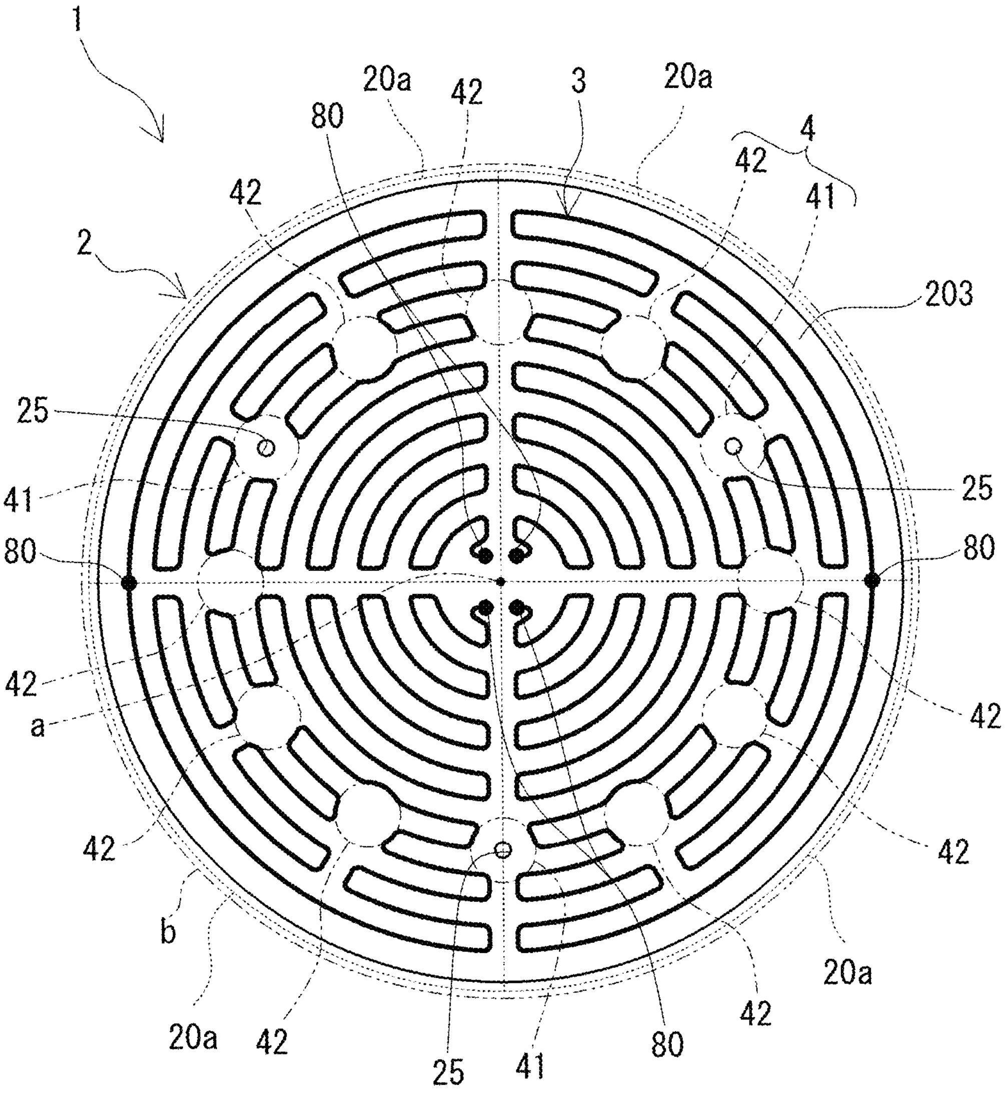
FIG. 11 is a schematic plan view of a heater according to a sixth embodiment.

A heater 1 of a sixth embodiment will be described with reference to FIG. 11. The heater 1 of the present embodiment differs from the heater 1 of the first embodiment mainly in that the first surface 201 includes a plurality of zones **20*a* into which the first surface 201** is segmented in the circumferential direction.

As described above, the zone **20*a* refers to a segment on the first surface 201 including a unit of heat-generating circuit whose temperatures is independently controllable. The number of the zones 20*a* may be selected from any appropriate numbers, such as two, three, and four. The number of the zones 20*a* in the present embodiment is four. The size of each zone 20*a* may be selected from any appropriately shapes. The size of each zone 20*a* refers to the size of the area of the zone 20*a* when the first surface 201 is seen in a plan view from the first surface 201 side. The shape of each zone 20*a* refers to the shape of the zone 20*a* when the first surface 201 is seen in a plan view from the first surface 201 side. The sizes of the zones 20*a* may be the same or may be different. The sizes of the zones 20*a* in the present embodiment are the same. The shape of each zone 20*a* in the present embodiment is a quadrant. The first surface 201 is evenly segmented into the four zones 20*a*** in the circumferential direction.

The heat generator 3 includes a plurality of heat-generating circuits. The expression "includes a plurality of heat-generating circuits" means that there are a plurality of heat-generating circuits whose temperatures are independently controllable. The number of the heat-generating circuits is a number corresponding to the number of the zones **20*a***. That is, the number of the heat-generating circuits in the present embodiment is four.

The number of the terminals 80 in the present embodiment is six. To be specific, among the six terminals 80, each of four terminals 80 is connected to one end of a corresponding one of the heat-generating circuits. The four terminals 80 are disposed near the center a in the present embodiment. Among the remaining two terminals 80, one terminal 80 is connected to the other end of each of a pair of the heat-generating circuits, and the other terminal 80 is connected to the other end of each of the remaining pair of the heat-generating circuits. The one terminal 80 and the other terminal 80 are disposed at positions that are near the third surface 203 and that are opposite to each other with the center a therebetween. In the present embodiment, the one terminal 80 and the other terminal 80 are disposed so to be separated to the left side and the right side of the sheet of FIG. 11.

In a case where the heater 1 includes the plurality of zones 20*a* as in the present embodiment, the number of blank areas 4 is greater than or equal to one time the least common multiple of the number of the zones 20*a* and the number of the first blank areas 41. The number of the zones 20*a* in the present embodiment is four, as described above. The number of the first blank areas 41 in the present embodiment is three, as with the first embodiment. That is, the number of the blank areas 4 is a multiple of twelve. The number of the blank areas 4 in the present embodiment is twelve.

[Advantageous Effects]

With the heater of the present embodiment, it is easy to make the temperature of the base 2 in the circumferential direction and the radial direction uniform, as with the first embodiment. Moreover, with the heater of the present embodiment, it is possible to precisely control the temperature of the first surface 201, because the heater includes the plurality of zones 20*a*.

Seventh Embodiment

Although illustration is omitted, a heater of a seventh embodiment differs from the heater of the first embodiment in that another hole portion that is different from a hole portion into which a lifter pin is inserted is provided on the same circumference on which the hole portion into which the lifter pin is inserted. The other hole portion may be at least one of the following: a hole portion in which the fastening member described in the third embodiment is provided; a hole portion in which the temperature sensor described in the fourth embodiment is provided; and a hole portion in which the terminal described in the fifth embodiment is provided. For example, if the base of the heater of the first embodiment is composed of the first base and the second base as in the third embodiment, in addition to a hole portion into which a lifter pin is inserted, a hole portion in which the fastening member described in the third embodiment is provided may be provided.

Example 1

In Example 1, the uniformity of the temperature of a base of a heater was examined.

[Sample No. 1]

A heater of sample No. 1 was the same as the heater 1 of the first embodiment, which has been described with reference to FIGS. 1 to 3. That is, the heater of sample No. 1 included the base 2, the heat generator 3, and the plurality of blank areas 4. The base 2 was a disk-shaped member made of ceramics. The diameter of the base 2 was 340 mm, and the thickness of the base 2 was 15 mm. The heat generator 3 was made by bending a metal to make a wiring pattern for forming a plurality of blank areas 4 described below. The wiring pattern of the heat generator 3 was provided also between the blank areas 4 that were adjacent to each other in the circumferential direction. The plurality of blank areas 4 were provided at regular intervals on a circumference that was centered at the center of the heat generator 3. The plurality of blank areas 4 included three first blank areas 41 each of which included the hole portion 25 and nine second blank areas 42 each of which did not overlap the hole portion 25. The centers of the first blank area 41 and the second blank area 42 were disposed at positions at 120 mm from the center of the heat generator 3. The radius of each of the first blank area 41 and the second blank area 42 was 10 mm.

[Sample No. 101]

Figure 12:
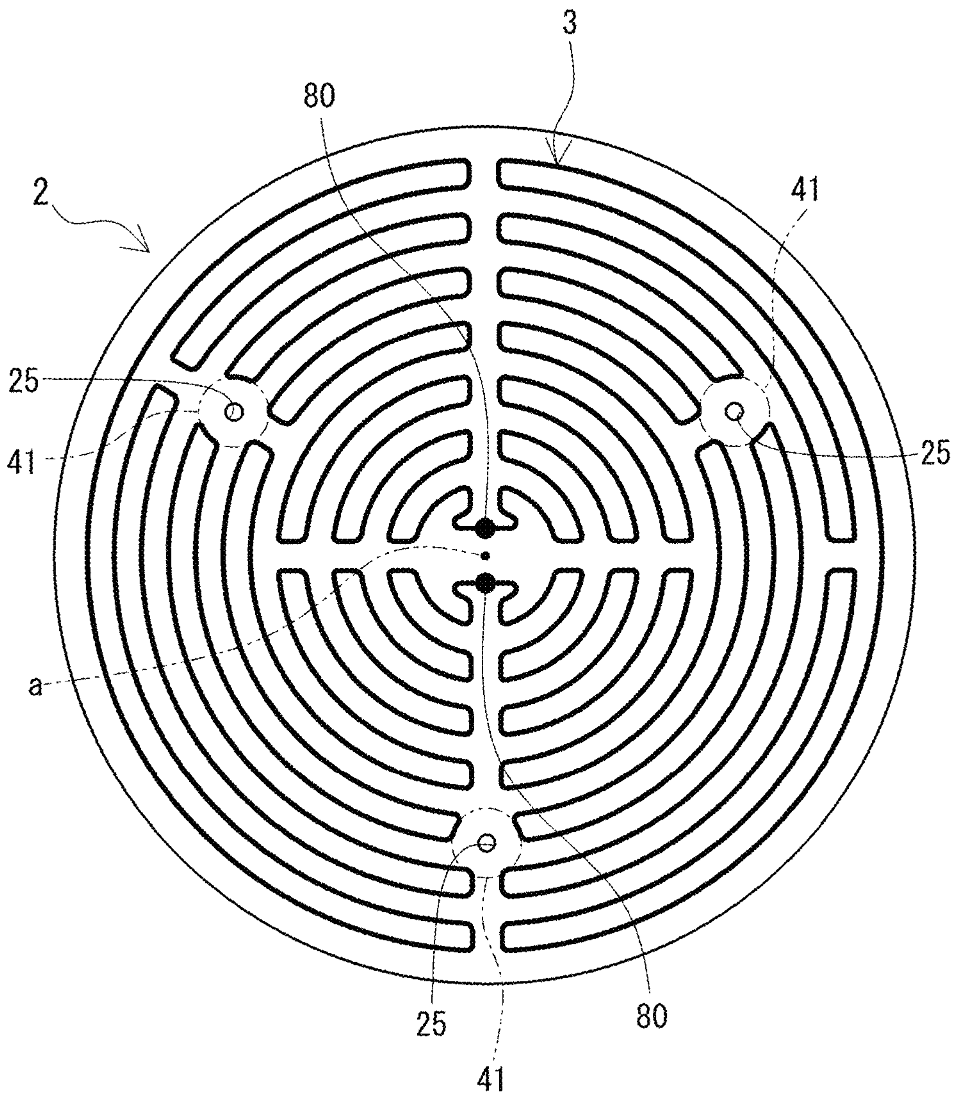
FIG. 12 is a schematic plan view of a heater of sample No. 101.

As illustrated in FIG. 12, a heater of sample No. 101 differed from the heater of sample No. 1 in the following respects.

(1) The heater of sample No. 101 did not include the second blank area 42 of the heater of sample No. 1.

(2) The wiring pattern of the heat generator 3 was provided in a region of the heater of sample No. 1 in which the second blank area 42 was provided.

In other respects, the heater of sample No. 101 was the same as the heater of sample No. 1. That is, in the heater of sample No. 101, the plurality of areas were constituted by only three first blank areas 41 each including the hole portion 25. The three first blank areas 41 were provided at regular intervals on a circumference centered at the center of the heat generator 3.

[Evaluation of Uniformity of Temperature]

Evaluation of the uniformity of the temperature of the base 2 was performed by evaluating the uniformity of the temperature of the first surface 201 in the circumferential direction and the uniformity of the temperature of the first surface 201 in the radial direction. Evaluation of the uniformity of the temperature in the circumferential direction was performed by calculating the difference between the highest temperature and the lowest temperature on a circumference passing through the centers of the first blank areas 41 and the second blank areas 42. Evaluation of the uniformity of the temperature in the radial direction was performed by calculating the largest difference between the highest temperature and the lowest temperature on a straight line extending in the radial direction and passing through the center of the heat generator 3 and the center of each blank area 4. In each evaluation, the temperature of the first surface 201 was measured by supplying electric power to the heat generator 3 to heat the first surface 201 to a set temperature of 400° C. The temperature of the first surface 201 was measured by using an infrared thermography camera capable of measuring temperature distribution. As the infrared thermography camera, InfReC R550, made by Nippon Avionics Co., Ltd. was used.

With the heater of sample No. 1, the difference between the highest temperature and the lowest temperature on the circumference passing through the centers of the blank areas 4 was less than or equal to 1° C. In contrast, with the heater of sample No. 101, the difference between the highest temperature and the lowest temperature on the circumference passing through the centers of the blank areas 4 was about 2° C. On the other hand, there was substantially no difference between the heater of sample No. 1 and the heater of sample No. 101 in the largest difference between the highest temperature and the lowest temperature on the straight line passing through the center of the heat generator 3 and the center of each blank area 4.

It was found that, with the heater of sample No. 1, it is possible to make the temperature of the base 2 in the circumferential direction uniform, compared with sample No. 101. Moreover, it was found that, with the heater of sample No. 1, it is possible to make the temperature of the base 2 in the radial direction uniform to the same degree as with sample No. 101.

The present invention is not limited to these examples and is intended to be represented by the claims and include all modifications within the meanings of the claims and the equivalents thereof

Additional Notes

The present disclosure includes the following embodiments that overlap also the foregoing descriptions.

[Additional Note 1]

A heater comprising:

a base having a first surface on which a heating target is to be placed and a second surface on a side opposite to the first surface; and a heat generator disposed on a third surface of the base, the third surface being parallel to the first surface, wherein the base includes a hole portion that opens in at least the second surface, wherein the third surface includes a plurality of blank areas on each of which the heat generator is not present and each of which is defined as a circular region, wherein the blank areas include a first blank area including a region that the hole portion overlaps in a direction perpendicular to the third surface, and a second blank area other than the first blank area, wherein a radius of the first blank area, with a centroid of the region that the hole portion overlaps being a center, is a shortest distance between the centroid and an edge of the heat generator, wherein a radius of the second blank area is equal to the radius of the first blank area, wherein a center of the first blank area and a center of the second blank area are arranged at regular intervals on a circumference that is centered at a center of an envelope circle of the heat generator in the third surface, wherein a length of each of the intervals between the blank areas on the circumference is greater than or equal to a length of one of the blank areas on the circumference, wherein separation distances between blank areas that are included in the plurality of blank areas and that are adjacent to each other are within ±10% of an average value of all of the separation distances, and wherein the heat generator includes a middle portion that is provided between each pair of the blank areas that are adjacent to each other in a circumferential direction.

With the heater of additional note 1, it is easy to make the temperature of the base in the circumferential direction uniform as with the heater according to an embodiment of the present disclosure described above in (1), because the separation distances are substantially equal and therefore the plurality of areas in each of which the heat generator is not present are arranged at substantially regular intervals on the same circumference.

[Additional Note 2]

A heater comprising:

a base having a first surface on which a heating target is to be placed and a second surface on a side opposite to the first surface; and a heat generator disposed on a third surface of the base, the third surface being parallel to the first surface, wherein the base includes a hole portion that opens in at least the second surface, wherein the third surface includes a plurality of blank areas on each of which the heat generator is not present and each of which is defined as a circular region, wherein the blank areas include a first blank area including a region that the hole portion overlaps in a direction perpendicular to the third surface, and a second blank area other than the first blank area, wherein a radius of the first blank area, with a centroid of the region that the hole portion overlaps being a center, is a shortest distance between the centroid and an edge of the heat generator, wherein a radius of the second blank area is within ±10% of the radius of the first blank area, wherein a center of the first blank area and a center of the second blank area are arranged at regular intervals on a circumference that is centered at a center of an envelope circle of the heat generator in the third surface, wherein a length of each of the intervals between the blank areas on the circumference is greater than or equal to a length of one of the blank areas on the circumference, and wherein the heat generator includes a middle portion that is provided between each pair of the blank areas that are adjacent to each other in a circumferential direction.

With the heater of additional note 2, it is easy to make the temperature of the base in the circumferential direction uniform as with the heater according to an embodiment of the present disclosure described above in (1), because the size of the first blank area and the size of the second blank area are substantially the same.

[Additional Note 3]

A heater comprising:

a base having a first surface on which a heating target is to be placed and a second surface on a side opposite to the first surface; and a heat generator disposed on a third surface of the base, the third surface being parallel to the first surface, wherein the base includes a hole portion that opens in at least the second surface, wherein the third surface includes a plurality of blank areas on each of which the heat generator is not present and each of which is defined as a circular region, wherein the blank areas include a first blank area including a region that the hole portion overlaps in a direction perpendicular to the third surface, and a second blank area other than the first blank area, wherein a radius of the first blank area, with a centroid of the region that the hole portion overlaps being a center, is a shortest distance between the centroid and an edge of the heat generator, wherein a radius of the second blank area is equal to the radius of the first blank area, wherein a center of the first blank area and a center of the second blank area are arranged at regular intervals on a circumference that is centered at a center of an envelope circle of the heat generator in the third surface, wherein a length of each of the intervals between the blank areas on the circumference is greater than or equal to a length of one of the blank areas on the circumference, and wherein a part of the heat generator is disposed between each pair of the blank areas that are adjacent to each other on the circumference.

With the heater of additional note 3, it is easy to make the temperature of the base in the circumferential direction uniform as with the heater according to an embodiment of the present disclosure described above in (1). Moreover, with the heater of additional note 3, it is easy to make the temperature difference in the radial direction small as with the heater according to an embodiment of the present disclosure described above in (1), because a part of the heat generator is provided between each pair of the areas that are adjacent to each other in the circumferential direction, compared with a case where the heat generator is not provided over the entire region between the adjacent blank areas.

[Additional Note 4]

A heater for heating a semiconductor wafer, comprising:

a base having a first surface on which a heating target is to be placed and a second surface on a side opposite to the first surface; and a heat generator disposed on a third surface of the base, the third surface being parallel to the first surface, wherein the base includes a hole portion that opens in at least the second surface, wherein the third surface includes a plurality of blank areas on each of which the heat generator is not present and each of which is defined as a circular region, wherein the blank areas include a first blank area including a region that the hole portion overlaps in a direction perpendicular to the third surface, and a second blank area other than the first blank area, wherein a radius of the first blank area, with a centroid of the region that the hole portion overlaps being a center, is a shortest distance between the centroid and an edge of the heat generator, wherein a radius of the second blank area is equal to the radius of the first blank area, wherein a center of the first blank area and a center of the second blank area are arranged at regular intervals on a circumference that is centered at a center of an envelope circle of the heat generator in the third surface, wherein a length of each of the intervals between the blank areas on the circumference is greater than or equal to a length of one of the blank areas on the circumference, wherein a part of the heat generator is disposed between each pair of the blank areas that are adjacent to each other on the circumference, wherein the heat generator is embedded in the base, and wherein the hole portion is a through-hole through which a lifter pin for supporting the heating target is to be inserted.

With the heater for heating a semiconductor wafer of additional note 4, it is easy to make the temperature of the base in the circumferential direction uniform as with the heater according to an embodiment of the present disclosure described above in (1). Moreover, with the heater for heating a semiconductor wafer of additional note 4, it is easy to make the temperature difference in the radial direction small as with the heater according to an embodiment of the present disclosure described above in (1), because a part of the heat generator is provided between each pair of the areas that are adjacent to each other in the circumferential direction, compared with a case where the heat generator is not provided over the entire region between the adjacent blank areas. Furthermore, with the heater for heating a semiconductor wafer of additional note 4, it is possible to lift the wafer by using a lifter pin for placing and replacing the wafer, because the hole portion is a through-hole into which the lifter pin is to be inserted. Therefore, the heater for heating a semiconductor wafer of additional note 4 is suitable as a heater for heating a wafer.

REFERENCE SIGNS LIST

1 heater
2 base

201 first surface
202 second surface
203 third surface
20*a* zone
21 first base
22 second base
25 hole portion
251 through-hole
252 blind hole
3 heat generator
31 middle portion
311 first middle portion
312 second middle portion
4 blank area
41 first blank area
42 second blank area
51 lifter pin
52 fastening member
53 temperature sensor
61 first connection portion
62 second connection portion
80 terminal
81 tip portion
90 heating target
A1 sectoral area
a center
b circumcircle
c inscribed circle
d circumcircle
L1, L3 distance
L2 length

The invention claimed is:

1. A heater comprising:

a base having a first surface on which a heating target is to be placed and a second surface on a side opposite to the first surface; and a heat generator disposed on a third surface of the base, the third surface being located between the first surface and the second surface and parallel to the first surface, wherein the base includes a hole portion that opens in at least the second surface, wherein the third surface includes a plurality of blank areas on each of which the heat generator is not present and each of which is defined as a circular region, wherein the plurality of blank areas include a first blank area including a region that the hole portion overlaps in a direction perpendicular to the third surface, and a second blank area other than the first blank area, wherein a radius of the first blank area, with a centroid of the region that the hole portion overlaps being a center, is a shortest distance between the centroid and an edge of the heat generator, wherein a radius of the second blank area is equal to the radius of the first blank area, wherein a center of the first blank area and a center of the second blank area are arranged at regular intervals on a circumference that is centered at a center of an envelope circle of the heat generator in the third surface, wherein a length of each of the intervals between the plurality of blank areas on the circumference is greater than or equal to a length of one of the plurality of blank areas on the circumference, and wherein the heat generator includes a middle portion that is provided between each pair of the plurality of blank areas that are adjacent to each other in a circumferential direction, and wherein at least one of the first blank area and the second blank area includes three or more contact portions that are in contact with the heat generator.

2. The heater according to claim 1, wherein the first surface includes a plurality of zones into which the first surface is segmented in the circumferential direction, wherein the heat generator is disposed so that a temperature of each of the plurality of zones is independently controllable, and wherein the number of the plurality of blank areas is an integer multiple, which is one or greater, of the least common multiple of the number of the plurality of zones and the number of the first blank area.

3. The heater according to claim 1, wherein a center of the first blank area and a center of the second blank area are arranged at regular intervals on a circumference that is centered at a center of an envelope circle of the heat generator in the third surface.

4. The heater according to claim 1, wherein a length of each of intervals between the plurality of blank areas on the circumference is greater than or equal to a length of one of the plurality of blank areas on the circumference.

5. The heater according to claim 1, wherein the second blank area includes a plurality of second blank areas, and the number of the second blank areas is a number such that a center-to-center distance along the circumference between the second blank areas that are adjacent to each other in the circumferential direction with none of the first blank area therebetween is greater than or equal to twice a length of one of the second blank areas on the circumference.

6. The heater according to claim 1, wherein the middle portion includes a first middle portion that is in contact with an edge part of each of the plurality of blank areas, and wherein the first middle portion has an arc shape along an outline of the plurality of blank areas.

7. The heater according to claim 1, wherein the middle portion includes a second middle portion having an arc shape that is concentric with the circumference.

8. The heater according to claim 1, wherein the radius of the first blank area is a distance that ensures electrical insulation between the hole portion and the heat generator in the first blank area.

9. The heater according to claim 1, wherein the heat generator is embedded in the base.

10. The heater according to claim 1, wherein the heat generator is fixed to the second surface of the base.

11. The heater according to claim 1, wherein the base includes a first base having the first surface, and a second base disposed on a side of the first base opposite to the first surface, and wherein the heat generator is interposed between the first base and the second base.

12. The heater according to claim 1, wherein the hole portion is a through-hole through which a lifter pin for supporting the heating target is inserted.

13. The heater according to claim 1, herein the heating target is a semiconductor wafer.

14. A heater comprising:

a base having a first surface on which a heating target is to be placed and a second surface on a side opposite to the first surface; and a heat generator disposed on a third surface of the base, the third surface being located between the first surface and the second surface and parallel to the first surface, wherein the base includes a hole portion that opens in at least the second surface, wherein the third surface includes a plurality of blank areas on each of which the heat generator is not present and each of which is defined as a circular region, wherein the plurality of blank areas include a first blank area including a region that the hole portion overlaps in a direction perpendicular to the third surface, and a second blank area other than the first blank area, wherein a radius of the first blank area, with a centroid of the region that the hole portion overlaps being a center, is a shortest distance between the centroid and an edge of the heat generator, wherein a radius of the second blank area is equal to the radius of the first blank area, wherein the heat generator includes a middle portion that is provided between each pair of the plurality of blank areas that are adjacent to each other in a circumferential direction, wherein the first surface includes a plurality of zones into which the first surface is segmented in the circumferential direction, wherein the heat generator is disposed so that a temperature of each of the plurality of zones is independently controllable, and wherein the number of the plurality of blank areas is an integer multiple, which is one or greater, of the least common multiple of the number of the plurality of zones and the number of the first blank area.

15. The heater according to claim 14, wherein a center of the first blank area and a center of the second blank area are arranged at regular intervals on a circumference that is centered at a center of an envelope circle of the heat generator in the third surface.

16. The heater according to claim 14, wherein a length of each of intervals between the plurality of blank areas on the circumference is greater than or equal to a length of one of the plurality of blank areas on the circumference.

17. The heater according to claim 14, wherein the second blank area includes a plurality of second blank areas, and the number of the second blank areas is a number such that a center-to-center distance along the circumference between the second blank areas that are adjacent to each other in the circumferential direction with none of the first blank area therebetween is greater than or equal to twice a length of one of the second blank areas on the circumference.

18. The heater according to claim 14, wherein the middle portion includes a first middle portion that is in contact with an edge part of each of the plurality of blank areas, and wherein the first middle portion has an arc shape along an outline of the plurality of blank areas.

19. The heater according to claim 14, wherein the middle portion includes a second middle portion having an arc shape that is concentric with the circumference.

20. The heater according to claim 14, wherein the radius of the first blank area is a distance that ensures electrical insulation between the hole portion and the heat generator in the first blank area.

* * * * *